United States Patent [19]

Ferro, Jr. et al.

[11] Patent Number: 4,855,907
[45] Date of Patent: Aug. 8, 1989

[54] METHOD FOR MOVING VSAM BASE CLUSTERS WHILE MAINTAINING ALTERNATE INDICES INTO THE CLUSTER

[75] Inventors: John T. Ferro, Jr.; Patrick C. Jacobs, both of San Jose; Robert M. Laye, Hayward; Brian D. Starr, Morgan Hill, all of Calif.

[73] Assignee: International Business Machines Corporation, Armonk, N.Y.

[21] Appl. No.: 184,655

[22] Filed: Apr. 22, 1988

Related U.S. Application Data

[63] Continuation of Ser. No. 761,739, Aug. 1, 1985.

[51] Int. Cl.[4] .............................................. G06F 7/00
[52] U.S. Cl. .............................. 364/300; 364/961.2; 364/900

[58] Field of Search .................. 364/200, 300, 900

[56] References Cited

U.S. PATENT DOCUMENTS

| | | | |
|---|---|---|---|
| 4,408,273 | 10/1983 | Plow | 364/200 |
| 4,620,295 | 10/1986 | Aiken, Jr. | 364/900 |
| 4,623,963 | 11/1986 | Phillips | 364/300 |
| 4,750,106 | 6/1988 | Aiken, Jr. | 364/200 |

Primary Examiner—Eddie P. Chan
Assistant Examiner—Adolfo Ruiz
Attorney, Agent, or Firm—R. Bruce Brodie

[57] ABSTRACT

A VSAM data set is moved to another DASD volume in less time than that required by logical processing by invoking a DASD track-oriented process extrinsic to VSAM which can select and order the transfer of VSAM components to a newly created VSAM cluster.

3 Claims, 1 Drawing Sheet

METHOD FOR MOVING VSAM BASE CLUSTERS WHILE MAINTAINING ALTERNATE INDICES INTO THE CLUSTER

This is a continuation of application Ser. No. 761,739 filed Aug. 1, 1985 now abandoned.

TECHNICAL FIELD

This invention relates to a method for moving individual base clusters of VSAM from a source to a target DASD volume while maintaining the integrity of the data set and its associated structures.

BACKGROUND OF THE INVENTION

In the prior art, Plow, U.S. Pat. No. 4,408,273, "Method and Means for Cataloging Data Sets Using Dual Keyed Data Sets and Direct Pointers", issued Oct. 4, 1983, describes various index sequential access methods, while Wiederhold, "Database Design", McGraw-Hill Publishing Co., pp. 182-189, copyright 1977, teaches some VSAM fundamentals. The data structures described by Wiederhold include the base clusters which are organized (cataloged) in the data structures used in the method described by Plow. Reference should also be made to IBM MVS/XA VSAM Users Guide, GC26-44015, page 39, published 1983, and IBM Integrated Catalog Facility, GC26-4019, pp. 178-188, published 1983. These IBM publications disclose VSAM data set transfer commands at the logic level. They also disclose the external interfaces for the access method services (AMS) utility.

The prior art, as exemplified by Gotlieb and Gotlieb, "Data Types and Structures", Prentice Hall, Inc., copyright 1978, describe film indices and directories at pages 330–339.

In discussing the fact that VSAM is a two-level or nested access method formed from an index-sequential access method and files (sequence set) nested within a B-tree (index set), Gotlieb et al point out at pages 338–339:

"Suppose that a B tree is grown as follows:
1. Only records (and their keys) are inserted.
2. A record can never leave the level (lowest) at which it was entered; when a (terminal) node of records splits, only the middle key value is passed up to the next level; the associated record (plus key) stays in one of the halves (say the left).
3. Each terminal node is linked to its lexical successor . . .

The result is an indexed-sequential file which grows by cellular splitting. Point 3 enables the file to be processed sequentially, independent of the index (except to find the starting record). This is essentially the organization used by IMB's VSAM (Virtual Storage Access Method) to store records in key order . . . "

In discussing VSAM as an access method utilizing B-tree indices defined onto contiguous portions of DASD storage and capable of accessing partial DASD tracks, Gotlieb et al state at page 339:

"When a B tree is implemented, questions of node size, placement, and creation (due to splitting) must be faced. VSAM, although hardware independent, represents specific design choices made in these regards. Each control interval is a contiguous portion of auxiliary storage; it might be a track, portion of a track, or several consecutive tracks, but it would not, for example, consist of tracks from different cylinders . . . VSAM determines some optimal number of control intervals to be grouped into a control area."

The above-mentioned Plow reference is directed to a method for managing access to a DASD storage subsystem utilizing a VSAM shared among lossely-coupled processors. Plow points out that access to records via a VSAM requires undertaking a two-level address mapping. First, access has to be made to a catalog, and then to an index. Plow characterizes his object as that of maintaining a catalog structure:

". . . residing on the shared data volume, which enables the opening of a user data set on a second data volume even where an external event has changed a data volume, resulting in loss of synchronization between said base catalog and said user data set . . . " (col. 48, lines 2-7)

THE INVENTION

It is an object of this invention to devise a method in which an extrinsic track-oriented process manages the selection, ordering, transfer, and catalog and index updating of a VSAM base cluster data set. More particularly, it is an object to devise a method for moving (not copying) a VSAM data set to another DASD volume in less time than by logical processing, said method avoiding the rebuilding of alternate indices wherever they may be situated at the target volume or otherwise.

The foregoing objects are satisfied by a method for moving a base cluster of VSAM (KSDS or ESDS) from a source to a target DASD volume. The source volume preferably may include an index and alternate indices to the cluster, a catalog mapping relations among VSAM components including candidate volumes, a virtual volume data set and records (VVDS and VVR) describing the VSAM components, and a volume table of contents (VTOC) relating VSAM component names to volume addreses. The method maintains the integrity of the cluster and associated catalogs by way of the following steps: (a) creating a newly defined VSAM data set and moving the data cluster by way of full-track read and write operations onto the target volume; (b) defining the indices, if any, on the target volume; and (c) renaming the newly defined data set.

The following are offered as clarifications of selected terms as used in the art. Thus, a "target volume" is the ultimate destination where the data sets are to reside. "Defining indices" is the operation by which the indexing mechanism is notified or invoked. Also, a "catalog record" contains volume and name information and last reference date during which a given data set was accessed. When data is moved from one location to another from within a virtual storage access method (VSAM), then catalog entries must be changed.

In the process of moving a "base cluster" (VSAM-related records and indices stored within a specifiable virtual address space termed a "control interval"), it is necessary to define the target data set and the catalog. To distinguish between the source and target data sets, the target is assigned a unique, albeit temporary, name.

The "base index" and the "alternate indices" constitute director search information, including a concordance of each record key and its relative byte addess (RBA) in the cluster. Parenthetically, "AIX" is the acronym for Alternate IndeX.

The term "sphere record emvironment" connotes an association of different kinds of information about VSAM data sets. The association itself constitutes the "sphere". It contains the references into the data set, lternate indices, and paths. SPHERE is a VSAM command.

"REPRO" or "IMPORT/EXPORT" advert to three eparate commands used by VSAM Access Method iervices (AMS). The REPRO or REPRODUCE is a opy command, while IMPORT and EXPORT refer espectively to commands effectuating reading and vriting of data from and to a source outside a given data et.

There is a distinction between COPY and MOVE ommands. A COPY command signifies replicating ata, i.e., reading data from location A and writing the ata on location B. On the other hand, a MOVE command includes a COPY command. That is, a MOVE ommand consists of COPY followed by a DELETE, e., COPY (A,B), DELETE (A). Thus, A is available or all purposes.

Where the clusters are of the type having alternate ıdices, the method satisfying the above objects includes the steps of (a) defining a newly defined catalog ecord and allocating space for a cluster on the target ·olume; (b) moving via full-track read/write commands designated cluster to the defined space; (c) disconnectıg the alternate index from the original catalog record nd reconnecting the alternate index into the newly iefined cluster; (d) retrieving other associated catalog ıformation such as paths, candidate volumes, and passvords, and defining such associated information into he newly defined catalog record; (e) deleting the origiıal catalog record and cluster; and (f) renaming the ıewly defined catalog record to the original base cluster name.

DESCRIPTION OF THE PREFERRED EMBODIMENT AND INDUSTRIAL APPLICABILITY

Presently, in order to move a VSAM data set from ɪne DASD volume to another, it is necessary to recogıize and manipulate the smallest (atomic) data element ɪf the data set and transport it from one volume to ₊nother and concurrently create indices referencing hat data element. A VSAM data set includes a base ꞉luster of keyed sequential data sets and/or entry seꞌuence data sets. The volume includes an index and ɪlternate indices into the cluster, a catalog mapping elations among VSAM components including candilate volumes, a virtual volume data set and records VVDS and VVR) describing the VSAM components ɪnd a volume table of contents (VTOC) relating VSAM ꞉omponent names to volume addresses.

In the past, in order to move a VSAM base cluster ɼom a source to a target DASD volume, it has been ɩecessary to define the entire VSAM data set structure ɪrior to initiating the move. This involves changes to ᴠTOC's, catalog entries, and VVDS's. The source data ₊et must now be opened and each logical record exracted one at a time and inserted into the target data ₊et. As part of the insertion into the target data set operɪtion, it is necessary to recognize any keyed fields and ꞉xecute appropriate insertions into the indices, thereby ɩuilding them. At the completion of this process for all of the records, the original source data set must be erased. Consequently, it is necessary to rebuild the entire data set and catalog entries, thus incurring overhead in the form of CPU time and channel activity (CPU/staged storage paths).

In this invention, in order to avoid reconstructing the indices as part of moving a VSAM base cluster from a source to a target DASD volume, the invention is premised on an extrinsic track-oriented process for managing the selection, ordering, transfer, and catalog and index updating. Broadly, this means that it is necessary to use host I/O commands for the reading and writing of full-track data from the source DASD to a buffer pool at the host and then back out to a target DASD from the buffer pool. Otherwise, some VSAM interfaces, such as the DEFINE command, would have to allocate the area, set up the catalog structure for the newly defined data set, and copy the data set by REPRO or IMPORT/EXPORT commands. Furthermore, the AMS commands would have to rebuild the alternate indices and complete the sphere record environment including all candidate volumes, paths, passwords, etc. In both the invention and its alternatives, calls to DADSM erase the source data set after the move has been successfully completed. Advantageously, the method of this invention allows failure of a step, permitting default to the original environment without information loss.

Figure 1:
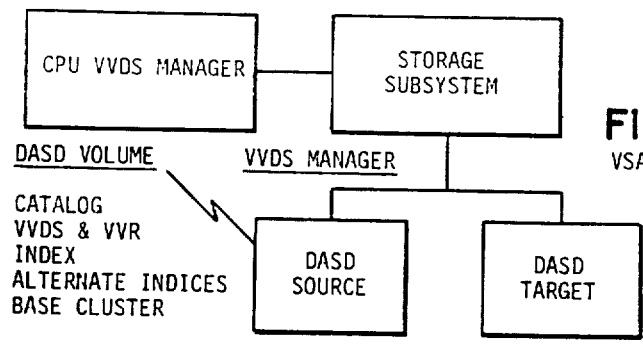
FIG. 1 shows abbreviated relationships between the ꞉PU, the storage subsystem, and elements of the /SAM system involved in the method of this invention.

Referring now to the Plow reference, there is described a complete VSAM data set and catalog structure including the VVDS declaration, VTOC interaction, and BCS catalog reference information (see Plow, FIG. 1, element 60; see column 8, line 59, through column 9, line 28). Furthermore, Plow is incorporated in this specification in its entirety by reference. In this regard, it should be understood that the invention operates in a Plow-type system both with reference to the physical and software processing environments.

Plow describes a data set catalog structure which permits accessing data sets efficiently either in a single or multiple CPU environment. Also, Plow teaches that if a catalog could be used as an index to a data set instead of the data set itself, then defects in the data set would not invalidate the index to the extent that the index is an independently alterable entity from the data set. The Plow patent is directed to the ICF catalog, the maintenance of which is considered to be a system function. For purposes of this invention, however, said system functions are not described and are considered explicitly outside the scope of this preferred embodiment.

Referring now to FIG. 1, there is shown the constituents involved in the invention. These include a VVDS manager resident to the CPU. The VVDS manager controls access to the VVDS data set. The VVDS data set defines the VSAM cluster structure including the base and alternate indices.

Figure 2:
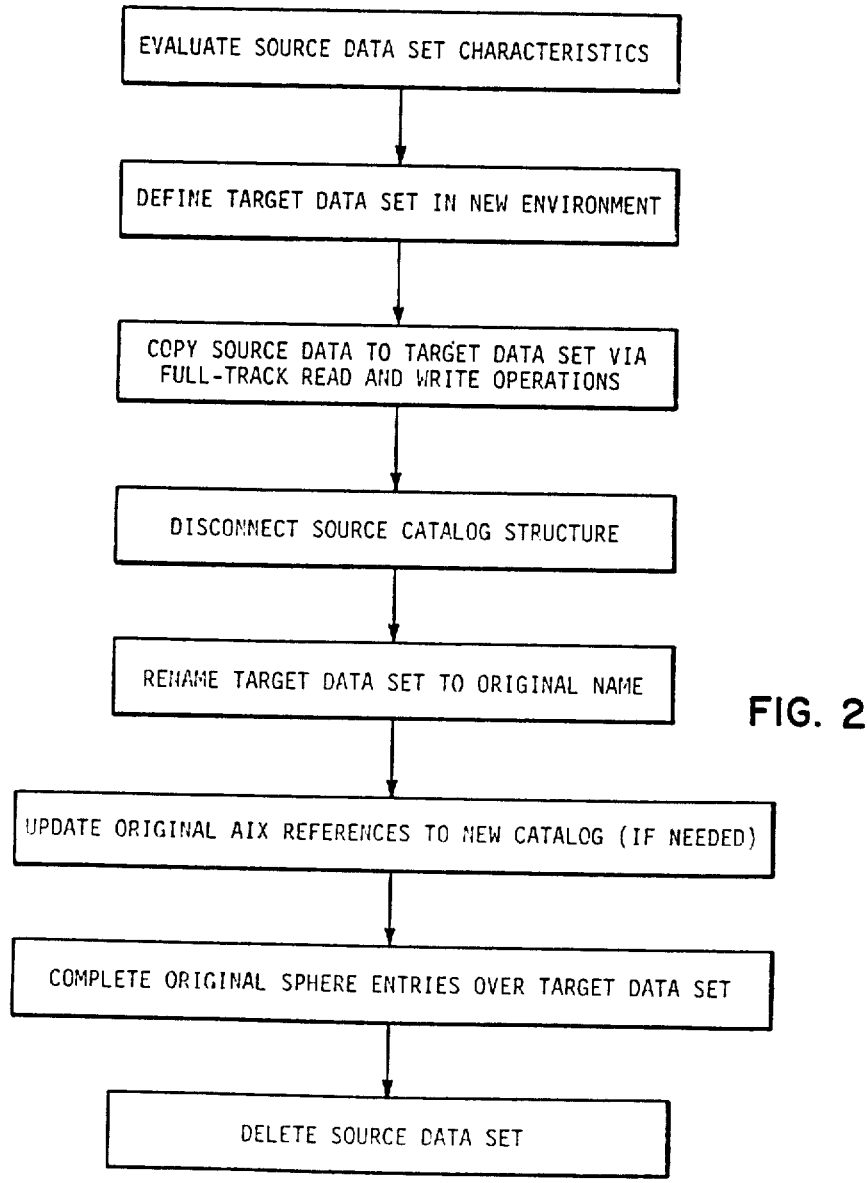
FIG. 2 depicts a high-level flow involved in moving aid data from a source to target DASD volumes.

Referring now to FIG. 2, there is depicted the flow of control of the method. As set out, the method involves evaluating source data set characteristics. This is followed by defining the target data set in a new environment. After this, the source data is copied to the target data set by way of full read and write operations and disconnection is made with the source catalog structure. Next, the target data set is renamed to that of the original name and updates of the original AIX references to the new catalog are made if needed. Lastly, the original sphere entries to the target data set are completed and the source data set is deleted.

Referring now to the table, there is set out a job control language sequence implementing the method steps of the invention. Job control language (JCL) is an operating system language described in IBM OS/VS II MVS JCL, GC28-0692-4, 5th Edition, May 1979. JCL is a metaprogram binding resources to application programs for the duration of their execution and for the duration of the execution of any related tasks. The syntax from left to right is <name of program>::<JCL statement>::<parameters for JCL statements>.

In the table, the first statement designates the name of the task exercising the method of the invention. Several statements are then directed to garnering the resources such as the data sets and system priority.

TABLE

"The following JCL code sequence assumes that a target volume has been prepared to accept a VSAM base cluster."

```
//COPYJOB  JOB  ,MSGLEVEL=(1,1),CLASS=A,REGION=3500K
/*ROUTE    PRINT STLVM7/JTFERRO
//*             COPY BASE CLUSTER FUNCTION
//*
//* STEP DSSUDUMP: ADRDSSU DUMP OF CLUSTER1.BASE CLUSTER
//DSSUDUMP EXEC PGM=ADRDSSU,REGION=2000K
//SYSPRINT DD   SYSOUT=A
//DASD01   DD   UNIT=3330,VOL=SER=333001,DISP=OLD
//TAPE01   DD   UNIT=3330,VOL=SER=333002,SPACE=(TRK,(1,1)),
//  DISP=(NEW,KEEP),DSNAME=USER.BACKUP
//SYSIN    DD   *
  DUMP IDD(DASD01) ODD(TAPE01) DATASET(INCLUDE(CLUSTER1.BASE))
/*
//* STEP DSSUREST: ADRDSSU RESTORE OF CLUSTER1.BASE CLUSTER
//DSSUREST EXEC PGM=ADRDSSU,REGION=2000K
//STEPCAT  DD   DSN=USE.CAT2,DISP=OLD
//SYSPRINT DD   SYSOUT=A
//DASD02   DD   UNIT=(3330),VOL=(PRIVATE,SER=333002),DISP=OLD
//TAPE01   DD   UNIT=3330,VOL=SER=333002,
//  DISP=(OLD,DELETE),DSNAME=USER.BACKUP
//SYSIN    DD   *
  RESTORE OUTDD(DASD02) INDD(TAPE01) DATASET(INCLUDE(**)) REPLACE
/*
```

"The following JCL code sequence connects the newly copied VSAM base cluster to its catalog and renames it to a temporary name."

```
//NAMETEMP JOB  ,MSGLEVEL=(1,1),CLASS=A,REGION=3500K
/*ROUTE    PRINT STLVM7/JTFERRO
//RENAMETM EXEC PGM=IDCAMS
//STEPCAT  DD   DSN=USE.CAT2,DISP=SHR
//SYSPRINT DD   SYSOUT=A
//AMSDUMP  DD   SYSOUT=A
//DASD01   DD   UNIT=3330,VOL=SER=333002,DISP=OLD
//SYSIN    DD   *
  DEFINE CLUSTER (NAME(CLUSTER1.BASE) VOLUMES (333002) -
                 MASTERPW(CLUSMPW1) ERASE -
                 KEY (4 0) TRK(2 1) CISZ(4096) RECSZ(1000 1000) -
                 RECATALOG ) -
                 CATALOG (USE.CAT2/USERMPW2)

ALTER -
            CLUSTER1.BASE/CLUSMPW1 -
            NEWNAME(TEMP1.BASE) -
            CATALOG(USE.CAT2/USERMPW2)
/*
```

This segment removes the basic catalog segment (BCS) entries for the ource base cluster without destroying the source data set."

```
/DELCLN01 JOB   ,MSGLEVEL=(1,1),CLASS=A,REGION=3500K
*ROUTE    PRINT STLVM7/JTFERRO
*
/* STEP 3: IDCAMS - DELETE CLUSTER NOSCRATCH OF CLUSTER1.BASE
/*                (PAGE 197)
/DELCLN01 EXEC PGM=IDCAMS
/SYSPRINT DD   SYSOUT=A
/AMSDUMP  DD   SYSOUT=A
/DASD01   DD   UNIT=(3330),VOL=SER=333001,DISP=OLD
/SYSIN    DD   *
    DELETE -
        CLUSTER1.BASE -
        CLUSTER -
        NOSCRATCH -
        CATALOG(USE.CAT1/USERMPW1)
'*
```

'The following segment is directed to removing the VVDS entries describing the base cluster."

```
'/DELVVR    JOB   ,MSGLEVEL=(1,1),CLASS=A,REGION=3500K
'*ROUTE    PRINT STLVM7/JTFERRO
'/* STEP 4A: IDCAMS - DELETE VVR NOSCRATCH OF CLUSTER1.BASE.INDEX
'/*                (PAGE 197)
'/*                 DELETE VVR NOSCRATCH OF CLUSTER1.BASE.DATA
'/*                (PAGE 197)
'/DELVVRN1 EXEC PGM=IDCAMS
'/STEPCAT  DD   DSN=USE.CAT1,DISP=SHR
'/SYSPRINT DD   SYSOUT=A
'/AMSDUMP  DD   SYSOUT=A
'/DASD01   DD   UNIT=3330,VOL=SER=333001,DISP=OLD
'/SYSIN    DD   *
    DELETE -
        CLUSTER1.BASE.INDEX -
        VVR -
        NOSCRATCH -
        FILE(DASD01) -
        CATALOG(USE.CAT1/USERMPW1)
/*
//* STEP 4B: IDCAMS - DELETE VVR NOSCRATCH OF CLUSTER1.BASE.INDEX
//*                (PAGE 197)
//*                 DELETE VVR NOSCRATCH OF CLUSTER1.BASE.DATA
//*                (PAGE 197)
//DELVVRN2 EXEC PGM=IDCAMS
//STEPCAT  DD   DSN=USE.CAT1,DISP=SHR
//SYSPRINT DD   SYSOUT=A
//AMSDUMP  DD   SYSOUT=A
//DASD01   DD   UNIT=3330,VOL=SER=333001,DISP=OLD
//SYSIN    DD   *
    DELETE -
        CLUSTER1.BASE.DATA -
        VVR -
        NOSCRATCH -
        FILE(DASD01) -
        CATALOG(USE.CAT1/USERMPW1)
/*
```

"This segment operates to substitute the original name for the temporary name."

```
//NEWNAME  JOB   ,MSGLEVEL=(1,1),CLASS=A,REGION=3500K
/*ROUTE    PRINT STLVM7/JTFERRO
//* STEP 5: IDCAMS - ALTER NEWNAME TEMP1.BASE TO CLUSTER2.BASE
//*                 (PAGE 37)
//NEWNAM01 EXEC PGM=IDCAMS
//STEPCAT  DD    DSN=USE.CAT2,DISP=SHR
//SYSPRINT DD    SYSOUT=A
//AMSDUMP  DD    SYSOUT=A
//DASD01   DD    UNIT=(3330),VOL=SER=333002,DISP=OLD
//SYSIN    DD    *
     ALTER -
         TEMP1.BASE/CLUSMPW1 -
         NEWNAME(CLUSTER1.BASE)
/*
```

"This segment redefines alternate indices present on the source volume but now form a portion of the target volume."

```
//DEFAIXS  JOB   ,MSGLEVEL=(1,1),CLASS=A,REGION=3500K
//JOBCAT   DD    DSN=USE.CAT2,DISP=SHR
/*ROUTE    PRINT STLVM7/JTFERRO
//* STEP 6: SUPERZAP - PUT CLUSTER2.BASE CATALOG NAME IN AIX VVRS
//* STEP 7: IDCAMS - DEFINE ALTERNATEINDEX RECATALOG FOR CLUSTER.AIX1
//*                  (PAGE 77)
//*                  DEFINE ALTERNATEINDEX RECATALOG FOR CLUSTER.AIX2
//*                  (PAGE 77)
//*                  DEFINE ALTERNATEINDEX RECATALOG FOR CLUSTER.AIX3
//*                  (PAGE 77)
//*                  DEFINE ALTERNATEINDEX RECATALOG FOR CLUSTER.AIX4
//*                  (PAGE 77)
//DEFAIXR1 EXEC PGM=IDCAMS
//SYSPRINT DD    SYSOUT=A
//AMSDUMP  DD    SYSOUT=A
//DASD01   DD    UNIT=3330,VOL=SER=333001,DISP=OLD
//SYSIN    DD    *
     DEFINE ALTERNATEINDEX -
         (NAME(CLUSTER.AIX1) -
         RELATE(CLUSTER1.BASE) -
         ATTEMPTS(3) -
         VOLUMES(333001) -
         TRACKS(1 1) -
         RECATALOG )
/*
//DEFAIXR2 EXEC PGM=IDCAMS
//SYSPRINT DD    SYSOUT=A
//AMSDUMP  DD    SYSOUT=A
//DASD01   DD    UNIT=3330,VOL=SER=333001,DISP=OLD
//SYSIN    DD    *
     DEFINE ALTERNATEINDEX -
         (NAME(CLUSTER.AIX2) -
         RELATE(CLUSTER1.BASE) -
         ATTEMPTS(3) -
         VOLUMES(333001) -
         TRACKS(1 1) -
         RECATALOG )
/*
//DEFAIXR3 EXEC PGM=IDCAMS
```

```
//SYSPRINT DD    SYSOUT=A
//AMSDUMP  DD    SYSOUT=A
//DASD01   DD    UNIT=3330,VOL=SER=333001,DISP=OLD
//SYSIN    DD    *
    DEFINE ALTERNATEINDEX -
         (NAME(CLUSTER.AIX3) -
         RELATE(CLUSTER1.BASE) -
         ATTEMPTS(3) -
         VOLUMES(333001) -
         TRACKS(1 1) -
         RECATALOG )
/*
//DEFAIXR4 EXEC PGM=IDCAMS
//SYSPRINT DD    SYSOUT=A
//AMSDUMP  DD    SYSOUT=A
//DASD01   DD    UNIT=3330,VOL=SER=333001,DISP=OLD
//SYSIN    DD    *
    DEFINE ALTERNATEINDEX -
         (NAME(CLUSTER.AIX4) -
         RELATE(CLUSTER1.BASE) -
         ATTEMPTS(3) -
         VOLUMES(333001) -
         TRACKS(1 1) -
         RECATALOG )
/*
```

"This segment adds the candidate volumes to the base cluster on the target volume."

```
//ADDVOLM  JOB  ,MSGLEVEL=(1,1),CLASS=A,REGION=3500K
/*ROUTE    PRINT STLVM7/JTFERRO
//* STEP 8: IDCAMS - ALTER ADDVOLUME FOR ONE CANDIDATE VOLUME
//*              (PAGE 37)
//ADDVOL02 EXEC PGM=IDCAMS
//STEPCAT  DD    DSN=USE.CAT2,DISP=SHR
//SYSPRINT DD    SYSOUT=A
//AMSDUMP  DD    SYSOUT=A
//DASD01   DD    UNIT=(3330),VOL=SER=333002,DISP=OLD
//SYSIN    DD    *
    ALTER -
         CLUSTER1.BASE.DATA -
         ADDVOLUMES(333001)
/*
```

"This segment defines the paths for the alternate indices to the base cluster on the target volume."

```
//DEFPATHS JOB  ,MSGLEVEL=(1,1),CLASS=A,REGION=3500K
/*ROUTE    PRINT STLVM7/JTFERRO
//* STEP 9: IDCAMS - DEFINE PATH FOR CLUSTER.AIX1
//*              (PAGE 161)
//*                DEFINE PATH FOR CLUSTER.AIX2
//*              (PAGE 161)
//*                DEFINE PATH FOR CLUSTER.AIX3
//*              (PAGE 161)
//*                DEFINE PATH FOR CLUSTER.AIX4
//*              (PAGE 161)
//DEFPATH1 EXEC PGM=IDCAMS
//STEPCAT  DD    DSN=USE.CAT2,DISP=SHR
```

```
//SYSPRINT DD    SYSOUT=A
//AMSDUMP  DD    SYSOUT=A
//DASD01   DD    UNIT=(3330),VOL=SER=333002,DISP=OLD
//SYSIN    DD    *
      DEFINE PATH -
          (NAME(CLUSTER.PATH1) -
          PATHENTRY(CLUSTER.AIX1) )
/*
//DEFPATH2 EXEC  PGM=IDCAMS
//STEPCAT  DD    DSN=USE.CAT2,DISP=SHR
//SYSPRINT DD    SYSOUT=A
//AMSDUMP  DD    SYSOUT=A
//DASD01   DD    UNIT=(3330),VOL=SER=333002,DISP=OLD
//SYSIN    DD    *
      DEFINE PATH -
          (NAME(CLUSTER.PATH2) -
          PATHENTRY(CLUSTER.AIX2) )
/*
//DEFPATH3 EXEC  PGM=IDCAMS
//STEPCAT  DD    DSN=USE.CAT2,DISP=SHR
//SYSPRINT DD    SYSOUT=A
//AMSDUMP  DD    SYSOUT=A
//DASD01   DD    UNIT=(3330),VOL=SER=333002,DISP=OLD
//SYSIN    DD    *
      DEFINE PATH -
          (NAME(CLUSTER.PATH3) -
          PATHENTRY(CLUSTER.AIX3) )
/*
//DEFPATH4 EXEC  PGM=IDCAMS
//STEPCAT  DD    DSN=USE.CAT2,DISP=SHR
//SYSPRINT DD    SYSOUT=A
//AMSDUMP  DD    SYSOUT=A
//DASD01   DD    UNIT=(3330),VOL=SER=333002,DISP=OLD
//SYSIN    DD    *
      DEFINE PATH -
          (NAME(CLUSTER.PATH4) -
          PATHENTRY(CLUSTER.AIX4) )
/*
```

While the preferred embodiment of the invention has been illustrated and described, it is to be understood that such does not limit the invention to the precise constructions herein disclosed, and the right is reserved to all changes and modifications coming within the scope of the invention as defined in the appendant claims.

We claim:

1. In a system having a DASD storage subsystem and a CPU coupling said DASD subsystem, said system utilizing selectively invocable nested storage access methods, said methods including a storage device level access method (ISAM) nested within a virtual storage access method (VSAM), said VSAM creating, modifying, or deleting data sets including records, catalogs, and indices, said data sets being accessed by VSAM only at a partial DASD tract-at-a-time-per-access basis, the recreation of any data set of related records, catalog entries, or indices from within VSAM including the steps of copying the records from a first to a second DASD location, and rebuilding the catalog entries and indices, a computer-implemented method for moving a data set of related records, catalogs, and indices from a first to a second DASD location from without VSAM, comprising the steps of:

(a) creating a newly-defined catalog record and allocating space for a data set on the second DASD location;

(b) invoking the device level access method by the CPU independently of VSAM; and (c) causing the invoked device level access method to execute the steps of:

(1) moving the data set resident at the first DASD location onto the second DASD location a full track at a time, preserving thereby all relative byte addressing of data set constituitive elements;

(2) defining the indices, if any, on the second DASD location and connecting them to the moved catalog;

(3) deleting the data set including catalogs and indices resident at the first DASD location; and (4) renaming the newly-defined catalog record to the original name.

2. A computer-implemented process for moving a data set representation utilized by a virtual storage access method (VSAM) from a first to a second location within a staged storage DASD subsystem attaching a CPU,
  said VSAM data set representation including records, catalogs, indices, and the like,
  said VSAM upon invocation by the CPU replicating said data set representation at another DASD location by steps including copying, and catalog and indices rebuilding a partial track of records at a time,
  said copying generically including the steps of reading information from a first location and writing the same at a second location, said moving generically including the steps of copying and then erasing the information at the first location,
  catalog and indices rebuilding including the steps of determining and recording the relative byte addressing of the records so moved,
  said CPU and storage subsystem including at least a storage DASD device level access method vertically nested within VSAM,
comprising the steps of:
  (a) creating a newly-defined VSAM data set at the second DASD location;
  (b) invoking the nested device level access method by said CPU independent of invocation of VSAM; and
  (c) causing said device level access method to execute the steps of:
    (1) moving the data set resident at the first DASD location onto the second DASD location a full track at a time, preserving thereby all relative byte addressing of data set constituitive elements;
    (2) defining the indices, if any, on the second DASD location and connecting them to the moved catalog;
    (3) deleting the data set including catalogs and indices resident at the first DASD location; and
    (4) renaming the newly-defined catalog record to the original name.

3. The process according to claim 2, wherein the step of creating the VSAM data set includes the steps of defining a new catalog entry under a temporary name from the second DASD location, said new entry selectively residing in the same or different catalog from that of the data set entry in the first DASD location.

* * * * *

UNITED STATES PATENT AND TRADEMARK OFFICE
CERTIFICATE OF CORRECTION

PATENT NO. : 4,855,907

DATED : August 8, 1989

INVENTOR(S) : John T. Ferro, Jr., Patrick C. Jacobs, Robert M. Laye, and Brian D. Starr It is certified that error appears in the above-identified patent and that said Letters Patent is hereby corrected as shown below:

IN THE SPECIFICATION:

Column 1, Line 35, Change "Film" to --File--.

Column 2, Line 61, Change "Director" to --Directory--.

IN THE CLAIMS:

Column 14, Line 45, Omit "from".

Column 14, Line 45, Insert "utilizing" after "without".

Signed and Sealed this

Twenty-ninth Day of May, 1990

Attest:

HARRY F. MANBECK, JR.

*Attesting Officer*     *Commissioner of Patents and Trademarks*